Dec. 18, 1928.
P. E. FENTON
1,696,156
FLOATING TRIM STUD
Filed Nov. 14, 1927
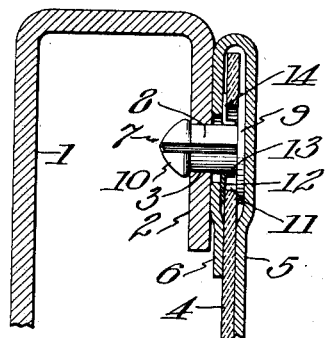
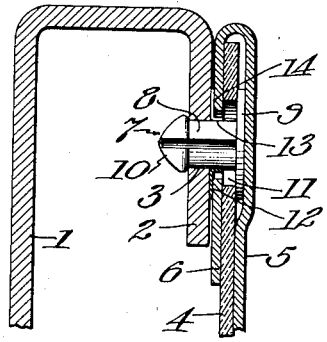
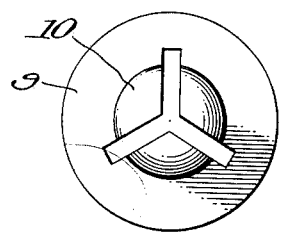
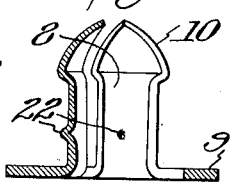
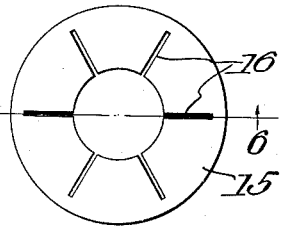
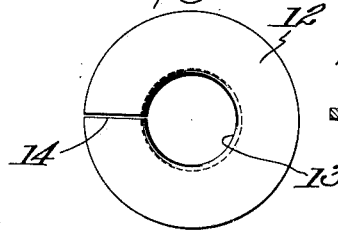
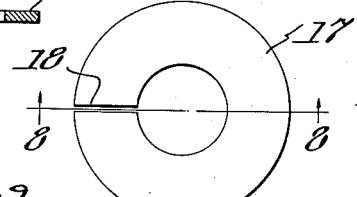
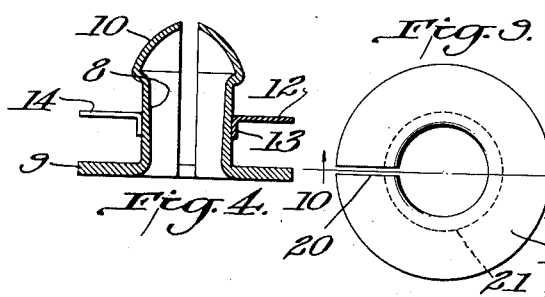
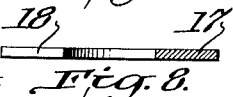
Inventor
Paul E. Fenton
by
Wm H. Fincel
Attorney Patented Dec. 18, 1928.

1,696,156

UNITED STATES PATENT OFFICE.

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT.

FLOATING-TRIM STUD.

Application filed November 14, 1927. Serial No. 233,194.

The object of this invention is to provide a stud for use primarily, but not exclusively, in attaching the trimming to automobile bodies which are built of metal, the stud being secured in place in such way that it may move or float on its attaching or supporting element to accommodate itself to the location of its complementary socket member.

In assembling the studs, it is desirable to have some means for retaining the stud in position when applied to the cardboard or other attaching or supporting element, but this means must be of such a character as not to injure the elastic limit of the spring shank and head of the stud, and it is also desirable that this means should be connected with the stud in a substantially fixed relation which will not interfere with the floating character of the stud by which the stud may move on its attaching or supporting element in seeking to register with the hole in a metallic element which it engages.

The invention consists of a spring washer that may be slipped over the head of the stud by a slight compression of the head and shank of the stud without impairing its elastic limit, and then find a position on the shank of the stud where it is retained in such relation to the attaching or supporting element that it will not interfere with, but on the contrary will freely allow the floating of the stud to find its register and engagement with the part which it engages, as I will proceed now to explain more fully and finally claim.

In the accompanying drawings illustrating the invention, in the several figures of which like parts are similarly designated, Figure 1 is a sectional elevation of parts of the metallic element, the attaching or supporting element, the upholstery and the stud and its retaining element in position of use. Fig. 2 is a top plan view of the stud. Fig. 3 is a top plan view of one form of spring washer. Fig. 4 is a longitudinal section of a stud with the washer of Fig. 3 in position thereon. Fig. 5 is a top plan view, and Fig. 6 a cross section on the line 6—6 of Fig. 5, of another form of spring washer. Fig. 7 is a top plan view, and Fig. 8 a cross section on the line 8—8 of Fig. 7, of still another form of spring washer. Fig. 9 is a top plan view, and Fig. 10 is a cross section on line 10—10 of Fig. 9, of still another form of spring washer. Fig. 11 is a longitudinal section of a modified form of stud shank in which nibs are used to hold the washer in given position. Fig. 12 is a view like Fig. 1 but showing the washer applied next to the inside lip of the upholstery. Fig. 13 is a side elevation of another form of stud in which the washer limiting feature is a compressed knurl.

As already stated, the invention is primarily designed for use in attaching the trimming or trim of metal-bodied automobiles, but it is obvious that it may be applied to other articles where useful. I will describe my invention as applied to automobile bodies; and referring to Fig. 1, the numeral 1 may indicate a cross section of an angular metal door frame of an automobile, having the inturned flange 2 provided with the openings 3, which last serve as sockets to engage the heads of the stud members. 4 may represent the cardboard or other attaching or supporting element or member used in trimming the frame, and 5 may represent the trimming of leather, cloth or other material, which is laid over the outer side of the cardboard and its end or edge 6 turned over upon the inner side of the cardboard and confined by the fastening means comprising the socket 3, and a stud, designated generally by the numeral 7.

I have shown herein three forms of such studs, in each of which the head member comprises the slitted spring shank 8, terminating in a base or flange 9 at one end and a conoidal head 10 at the other end. The flange 9 is only partly slitted.

It will be observed that in none of these forms of studs are there any prongs which engage the cardboard or other attaching or supporting element, but the flange is arranged to contact with the outside of the cardboard and the shank passes through a hole 11 in the cardboard which is of considerably larger size than the diameter of the shank of the stud so as to permit freedom of movement of the stud in seeking to register with the hole 3, and the stud is held in such floating position on the cardboard by a spring washer applied to the shank on the inner side of the cardboard between the cardboard and the turned-over end 6 of the trimming of leather, cloth or other material, herein referred to as the upholstery. But as shown in Fig. 12, the washer may be applied on the inner side of this turned-over portion 6.

The spring washer may be of any of a number of forms, some of which are herein shown. Referring to the form shown in Figs. 1, 3, 4 and 12, the washer comprises an annulus 12, and a barrel portion 13 depending from the inside thereof and a radial slit 14. The inside diameter of the washer and its barrel is smaller than the greatest diameter of the head of the stud and of substantially the same diameter as the expanded shank, so that the washer may be sprung over the head of the stud and then slipped down below such head in position to engage the shank with sufficient friction incident to the resilience of the shank and the washer, to hold the washer in position.

As shown in Figs. 5 and 6, the washer may have an annular body 15 provided with a number of radial slits 16 extending only partway through the body, but yielding to permit the passage of the washer over the head of the stud. As will be observed, there is no barrel employed on this form of washer.

Another form of washer is shown in Figs. 7 and 8. In this form of washer, the stock may be somewhat thicker than in the others shown, and it has no barrel, but is a simple flat annulus 17, provided with a single radial through slit 18.

In Figs. 9 and 10 a washer is shown of thin material, having the body 19 slightly dished, and provided with a radial through slit 20, and the rolled-back flange 21 instead of a barrel such as shown in Figs. 1, 3, 4 and 12.

All of these washers have sufficient resilience to permit of their being sprung over the head of the stud and then return to normal so as to engage the shank of the stud.

In order to locate the washers or any of them, the shank may be provided with nibs 22, Fig. 11, with which the washer engages. Or, instead of the nibs, there may be a compressed knurl 23, Fig. 13, which cooperates with the washer for the same purpose.

By the use of the split washer, the inside diameter of which is slightly less than the diameter of the shank of the stud, its resilience absorbs part of the strain of mounting over the wider diameter of the head of the stud and when it reaches the shank, it can be pushed to place without distorting the stud or compressing its resilient members, because the washer itself is resilient and absorbs the strain, as stated. In the case of the washer using a barrel, its inside diameter is smaller than the diameter of the shank, and when it is pushed to its ultimate position, as indicated in Figs. 1 and 12, it binds through its resiliency and holds it and the stud in place when mounted on the cardboard.

This same principle applies also to the spring washers or sheared washers without a barrel.

The floating feature is brought about by placing a larger hole in the cardboard than the diameter of the shank of the stud, as already stated, and the extent of float is controlled by the relative size of the hole in the cardboard and the diameter of the stud.

In prior inventions, the stud is provided with prongs which are stuck through the cardboard and clinched, and means also are provided for holding the stud in movable relation to its attaching means; but in the present invention the washer and the flange at the base of the stud take the place of such prongs and stud-holding means.

Other variations than those described are permissible within the principle of the invention and the scope of the claims following.

What I claim is:—

1. A floating trim stud, comprising a stud member having a base flange, a resilient shank and head rising therefrom, the head having a greater diameter than the diameter of the shank, and a spring washer adapted to be forced over the head and into resilient engagement with the shank while the shank is under compression and to hold the stud in floating position.

2. A floating trim stud, comprising a stud member having a base flange, a resilient shank and head rising therefrom, the head having a greater diameter than the diameter of the shank, and a spring washer adapted to be forced over the head and into resilient engagement with the shank while the shank is under compression and to hold the stud in floating position, said washer having means to engage the shank to locate the washer in floating position.

3. A floating trim stud, comprising a stud member having a base flange, a resilient shank and head rising therefrom, the head having a greater diameter than the diameter of the shank, and a spring washer adapted to be forced over the head and into resilient engagement with the shank while the shank is under compression and to hold the stud in floating position, said shank having means for cooperating with means on the washer to locate the washer on the stud in floating position.

4. The combination with a stud member having a resilient shank and head, of a spring washer adapted to be forced over the head and into resilient engagement with the shank, said washer having a depending barrel encircling the shank and in sustaining engagement with the shank.

5. The combination with a stud member having a resilient shank and head, of a spring washer adapted to be forced over the head and into resilient engagement with the shank, said washer having a depending barrel, the inside diameter of the washer and its barrel being smaller than the greatest diameter of the head of the stud and of substantially the same diameter as the expanded shank, so that the washer may be sprung over the head of the stud and then slipped down on the shank into sustaining engagement with said shank.

In testimony whereof I have hereunto set my hand this 10th day of November A. D. 1927.

PAUL E. FENTON.